United States Patent [19]

Herscher et al.

[11] Patent Number: 4,706,761
[45] Date of Patent: Nov. 17, 1987

[54] TILLING MACHINE WITH PIVOTAL BI-DIRECTIONAL OPERATIVE TINES

[75] Inventors: Lee R. Herscher, Kankakee; Gerold G. Goertzen, St. Anne, both of Ill.

[73] Assignee: Roper Corporation, Kankakee, Ill.

[21] Appl. No.: 696,725

[22] Filed: Jan. 31, 1985

[51] Int. Cl.⁴ ............................................. A01B 33/14
[52] U.S. Cl. ......................................... 172/42; 172/91; 172/545; 172/556
[58] Field of Search ....................... 172/42, 43, 45, 91, 172/96, 123, 544, 545, 548, 549, 550, 556; 56/294

[56] References Cited

U.S. PATENT DOCUMENTS

| | | | |
|---|---|---|---|
| 1,450,173 | 4/1923 | Frickey | 172/45 |
| 1,802,711 | 4/1931 | Fitts | 172/21 |
| 2,325,997 | 8/1943 | Kelly et al. | 172/545 |
| 3,087,555 | 4/1963 | Lester | 172/94 |
| 3,151,685 | 10/1964 | Field | 172/556 |
| 4,492,271 | 1/1985 | Doering | 172/43 |
| 4,556,113 | 12/1985 | Saito et al. | 172/91 |
| 4,611,669 | 9/1986 | Ballard | 172/42 X |
| 4,615,395 | 10/1986 | Nagamine | 172/548 X |

FOREIGN PATENT DOCUMENTS

| | | | |
|---|---|---|---|
| 2551857 | 6/1977 | Fed. Rep. of Germany | 172/96 |
| 3389804 | 5/1984 | Fed. Rep. of Germany | 172/123 |
| 2039201 | 8/1980 | United Kingdom | 172/96 |

Primary Examiner—Richard J. Johnson
Attorney, Agent, or Firm—Leydig, Voit & Mayer

[57] ABSTRACT

A tine assembly for use with a rotary tiller comprising a selectively rotatable tine shaft and a plurality of pivotally mounted tines. The tines each include stop surfaces associated with an innermost end of the tine whereby the tine pivots to one position when the tine shaft is rotated in a clockwise direction and automatically pivots to a second position when the tine shaft is rotated in a counterclockwise direction. The angle of pivot between the two positions is such that the leading edge of the ground engaging portion of the tine sweeps a larger radius than the following portion of the tine when the tine shaft is rotated in either the clockwise or counterclockwise directions.

25 Claims, 7 Drawing Figures

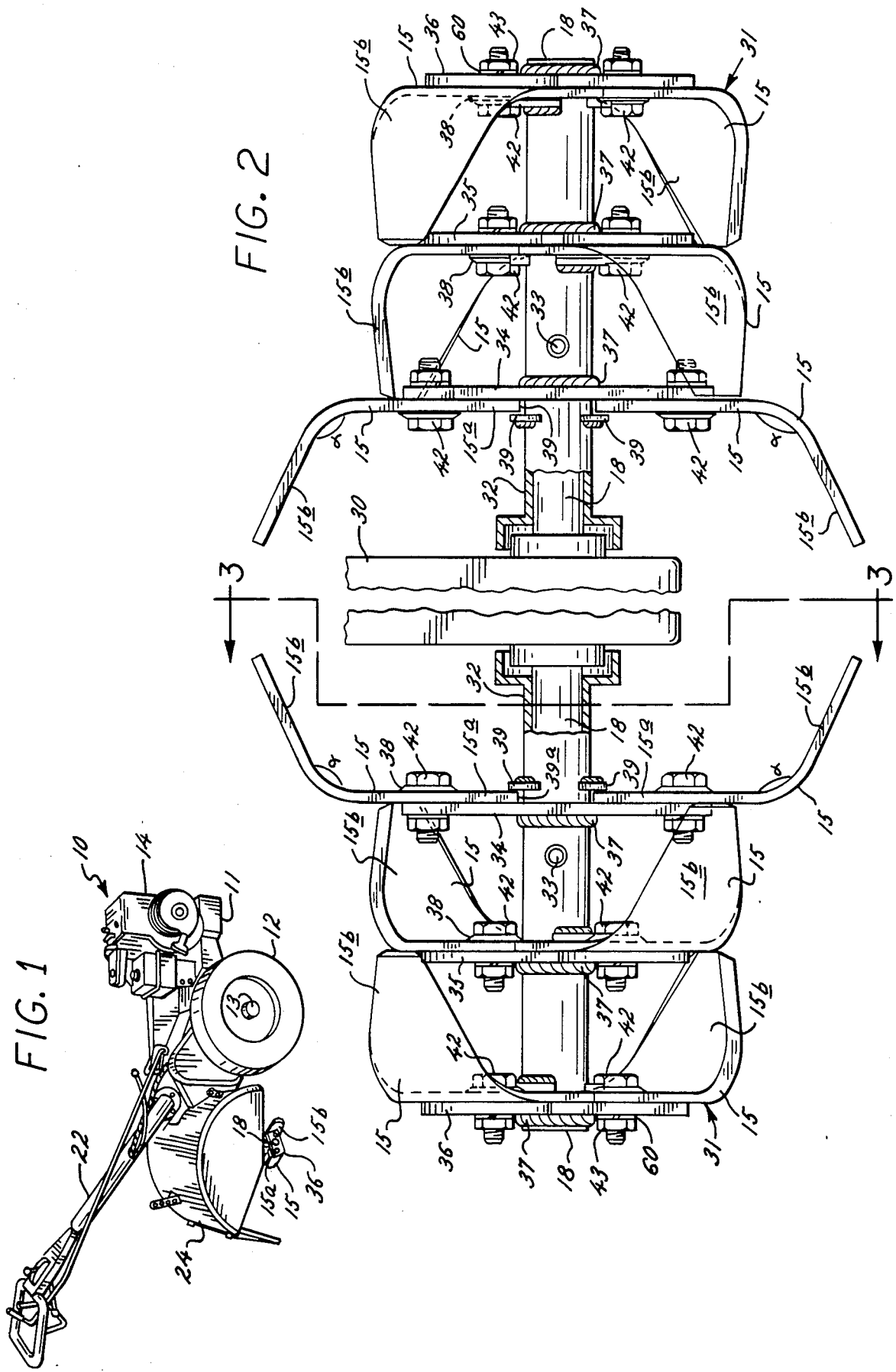

TILLING MACHINE WITH PIVOTAL BI-DIRECTIONAL OPERATIVE TINES

The present invention relates to power operated soil tilling machines, and more particularly, to soil tilling machines of the type that are manually manipulated and controlled by a person walking with or behind the machine.

Manually operated soil tilling machines of the type intended for garden usage commonly comprise a frame having driven ground wheels and a single power driven tine shaft carrying a plurality of tines for penetrating and pulverizing the earth. Such tines are typically mounted in fixed relation to the tine shaft and at such an angle that the cutting edge of the tine will contact the ground, with the remainder of the tine trailing without cutting the untilled soil. This angle is commonly referred to as a "clearance angle" or "rake angle" and is necessary for achieving efficient tilling action.

The ground wheels of such tilling machines usually can be driven in either forward or reverse directions to facilitate movement of the machine during tilling or during transport of the machine to and from the tilling site. The tine shaft, however, is typically driven in the same rotart direction as the forward ground wheel movement such that the tine rotation tends to assist the forward propulsion of the machine during tilling. When the tine is driven in this direction, it is often called a "standard rotating tine" or "SRT". In such instances, upon forward movement of the machine, the cutting edges of the tines will successively engage the top of the ground to penetrate successive layers of earth in the direction of machine movement.

Other tilling machines have tines that are mounted on the tine shaft for rotation in a direction counter to that of the forward ground wheel movement such that the tines sweep upwardly through the untilled soil. When the tine is driven in this direction, commonly referred to as a "counter rotating tine" or "CRT", it creates rearwardly directed, reactionary forces which act on the machine during tilling. It has been found that tilling machines operating in this manner, wherein the tines penetrate and cut upwardly through the untilled soil in relatively discrete layers, till the ground more deeply and aggressively than SRT tilling machines because the tines in SRT tillers engage the top of the soil and in effect compress the soil during penetration. Tilling with SRT tillers, however, is particularly effective where the ground is already loose and pulverized and where more aggressive tilling is not required.

In the past, it has been necessary to utilize either a standard rotating tiller, designed as such, or a counter rotating tiller, designed as such, in order to take advantage of the benefits of these two desired operations. More recently, garden tillers have become available in which the tine shaft can be driven in both the counter rotating direction and the standard rotating direction so that the tines can cut upwardly or downwardly through the utilized soil at the option of the person operating the machine. When changing from counter rotating to standard rotating tilling, in some such machines it is necessary for the operator to reverse the positions of the tines on the tine shaft to ensure that the tines approach the soil with the necessary clearance angle. While other tillers of such type are operated in both modes without adjusting the tines, they do not achieve optimum, through tilling in one or both directions because it is not possible for the tines to engage the ground at the most efficient clearance angle in both directions of travel.

It is an object of the present invention to provide a soil tilling machine adapted for thorough and efficient tilling when the tines are driven in either standard rotating or counter rotating directions.

Another object of the invention is to provide a soil tilling machine as characterized above that may be simply and quickly converted from a standard rotating to counter-rotating mode of operation, and vice versa, without requiring manual adjustment or alteration of the tines.

A further object of the invention is to provide a tilling machine of the above kind with automatically adjustable tines so that the individual tines engage the ground at an appropriate clearance angle to ensure effective tilling in either the standard rotating or counter rotating drive modes.

Other objects and advantages of the invention will become apparent upon reading the following detailed description and upon reference to the drawings, in which:

FIG. 1 is a perspective of an illustrative soil tilling machine embodying the present invention;

FIG. 2 is an enlarged rear elevation view of the tine assemblies of the illustrated machines;

Figure 6:
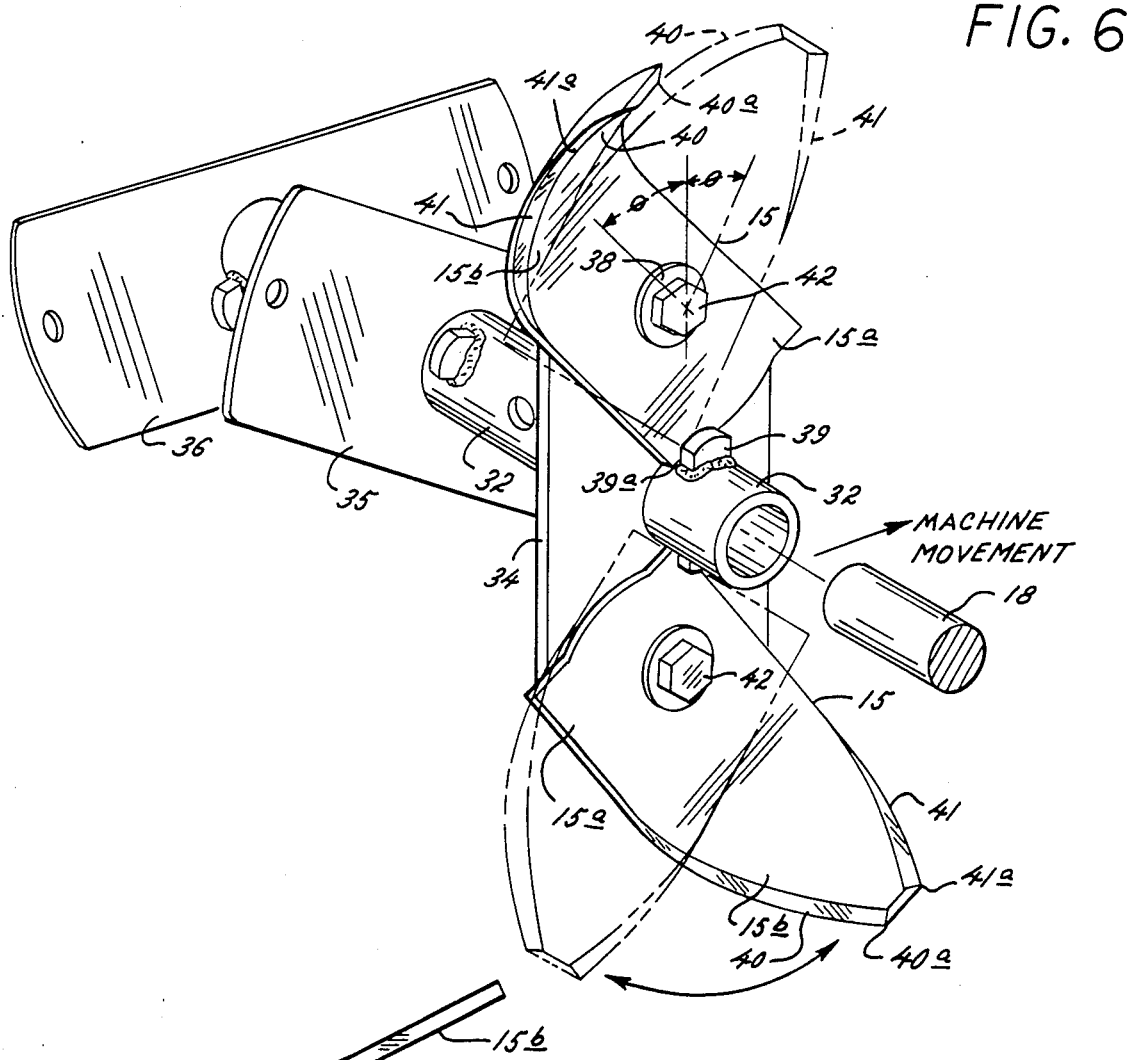
Figure 7:
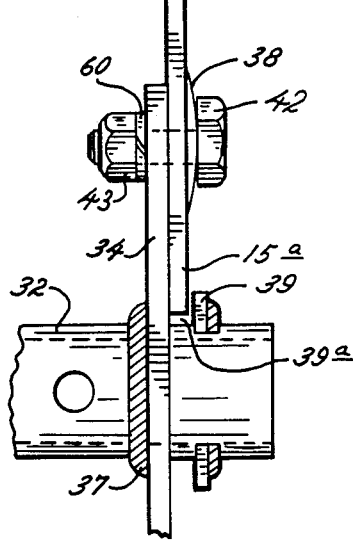

FIG. 6 is an enlarged perspective of the hub of one of the tine assemblies of the illustrated tilling machine removed from the tine shaft, with one pair of tines shown in solid lines in their standard rotating tine (SRT) position and in phantom in their counterrotating tine (CRT) position; and FIG. 7 is an enlarged, fragmentary side view of one of the tine mountings for the illustrated tine assembly.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the appended claims.

Referring now more particularly to the drawings, there is shown in FIG. 1 an illustrative soil tilling machine 10 embodying the present invention. The tilling machine 10 includes an elongated frame 11 which serves as a primary structural support of the machine. The frame 11 is supported by a pair of ground wheels 12 mounted on an axle 13 rotatably carried in the frame and operatively connected to an internal combustion engine 14 through a suitable drive train. A single row of ground penetrating and pulverizing tines 15 is mounted on a rotatable tine shaft 18 operatively connected to the engine 14 through an appropriate power transmission and carried transversely to the line of machine movement. An adjustably positionable handle 22 extends rearwardly of the frame 11 for enabling a user to operate the machine 10 while walking from behind. A tine shield 24 is mounted rearwardly of the frame 11 for protecting the operator from flying soil and debris during operation of the tilling machine.

As better shown in FIG. 2, power is transmitted to the tine shaft 18 through an appropriate power transmission, shown generally as 30, which may be of a conventional type adapted to permit selective driving of the tine shaft in the same rotart direction as the ground wheels or in an opposite, counter-rotating direction. Accordingly, when the tilling machine 10 is driven in a forward operating direction, the wheels 12 rotate in a clockwise direction, as viewed in FIG. 1, and the tines 15 may be operated in the same rotary direction so as to cut downwardly through the untilled soil, or alternatively the tines 15 may be selectively operated in an opposite counterclockwise direction so as to cut upwardly through the untilled soil. As is known in the art, the relative rotary speeds of the ground wheels 12 and the tine shaft 18, and thus the peripheral speeds of the ground wheels 12 and tines 15, can be selectively established for a given engine output by appropriate design of the drive trains.

Figure 3:
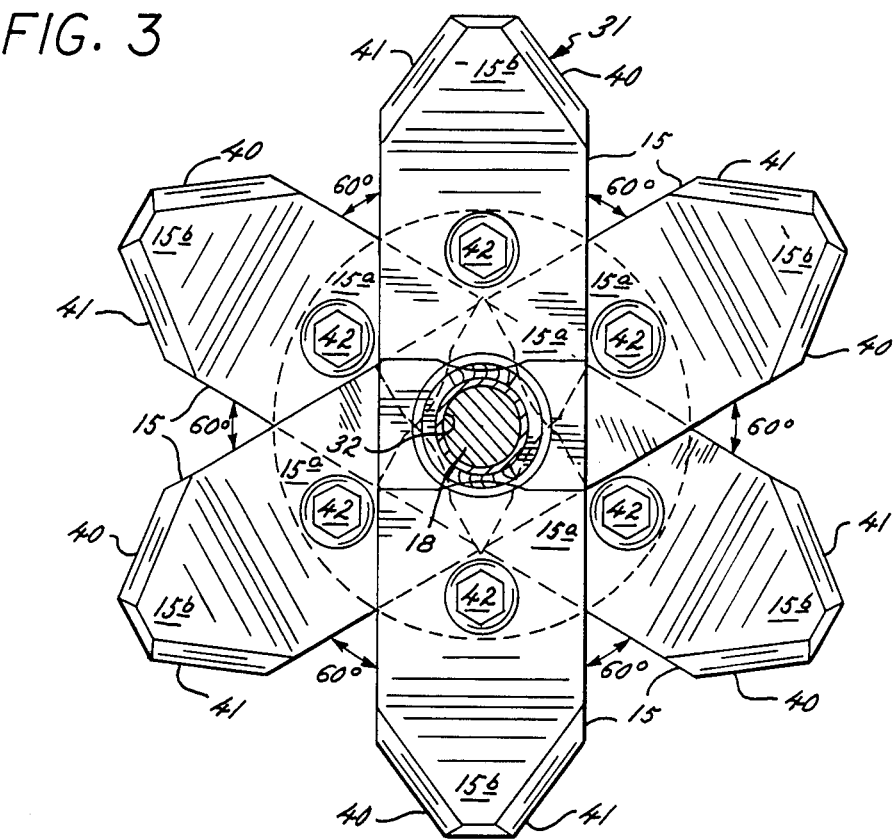
FIG. 3 is a vertical section of the tine assemblies of the illustrated machine taken in the plan of line 3—3 in FIG. 2 and showing the tines in a central or non-operating position.

Mounted upon the tine shaft 18 on opposed sides of the tine transmission 30 in the illustrated machine, as best shown in FIGS. 2 and 3, are similar tine assemblies 31, each including three axially spaced pairs of 180° out-of-phase tines 15, each pair being 60° out-of-phase from the other pairs. The tines 15 of each pair are mounted at diametrically opposed ends of a respective transverse tine mounting plate 34, 35, 36 mounted on a tine assembly hub 32, which in turn is fitted over the respective end of the tine shaft 18 and secured to the tine shaft by a pin 33. The mounting plates 34, 35, 36 in this instance are fixed to the hub 32 by weldments 37. The illustrated tines 15 are of a hoeing type, each having a base portion 15a and a tip portion 15b, the tip portion 15b extending laterally to the base portion 15a at the distal end thereof. The angle $a$ between the base portion 15a and the tip portion 15b in this case is about 115°.

The illustrated tine assemblies 31, as shown in FIG. 2, each include a pair of outermost tines 15 mounted at their bases 15a to an outermost tine mounting plate 36 such that the tip portions 15b are directed laterally inwardly, a pair of intermediate tines 15 mounted on an intermediate tine mounting plate 35 with the tip portions 15b directed laterally inwardly, and a pair of innermost tines 15 mounted on an innermost tine mounting plate 34 with the tip portions 15b also disposed laterally inwardly. For balancing the reaction forces on the tine shaft 18 during tilling, the tine assemblies 31 are similarly positioned on the opposed ends of the tine shaft 18 such that the outermost tines simultaneously contact the soil, as do the intermediate tines and the innermost tines.

In accordance with the invention, the tines are mounted for pivotal movement such that when the tine shaft is driven in a standard rotating tine (SRT) direction, the tines assume one position adapted for efficient tilling in such drive mode, and when the tine shaft is driven in a counter rotating tine (CRT) direction, the tines are pivotable to a second position adapted for efficient tilling in that particular drive mode. To this end, the tines 15 each are pivotably mounted near an outer end of their respective tine mounting plate 34, 35, 36, in this instance each being pivotably supported on a mounting bolt 42 extending through the end of the respective mounting plate. A nut 43 and lock washer 60 in this case captively retain the tine 15 on its mounting plate. For permitting pivotable movement of the tine relative to the mounting bolt 42 without excessive lateral play on the bolt, a spring washer 38 is interposed between the head of each mounting bolt 42 and the tine for biasing the tine against its mounting plate. For further retaining the inner end of the base portion 15a of each tine against excessive lateral movement, a pair of tabs 39 are welded on the hub 32 in spaced relation to each mounting plate 34, 35, 36 for defining respective channels 39a (FIG. 7) within which the inner ends of the base portions 15b of each pair of tines are loosely received.

In keeping with the invention, the tip portion of each tine is formed with a pair of cutting edges on opposite sides thereof and means are provided for limiting pivotal movement of the tines such that the tines are automatically oriented in proper position for efficient tilling when the tilling machine is operated in either a standard rotating tine or counter-rotating tine drive mode. As shown in FIG. 3, the tip portion 15b of each tine is tapered and beveled to form cutting edges 40, 41 on each side of the tine, the cutting edge 40 being adapted to engage and sever discrete layers of soil when the tilling machine is operated in a standard rotating tine drive mode and the cutting edge 41 of each tine being adapted to engage and sever the untilled soil when the tilling machine is operated in a counter-rotating tine drive mode.

For limiting pivotal tine movement and retaining the tines in a predetermined fixed position for achieving optimum tilling for the desired operating mode, the tines 15 are pivotably mounted on their respective mounting bolts 42 at locations on the tine mounting plates 34, 35, 36 in radially spaced relation to the hub 32, and thus the tine shaft 18, and the inner end of each tine is formed with stop surfaces or flanges 44, 45 for engaging the hub 32 on opposed sides thereof to limit pivotal movement of tine between fixed positions. The inner ends of the tines 15 in this case each are formed with a central outwardly curved portion 46 between the stop surfaces 44, 45, a portion of which is disposed in the channel 39a defined by each tab 39 and the respective mounting plate at both extreme pivotal positions of the tine.

Figure 4:
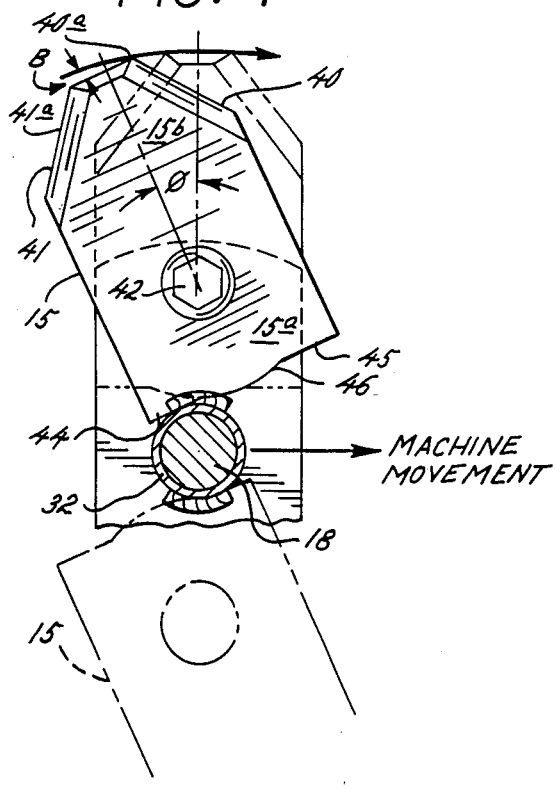
FIG. 4 is a side view showing tines of the illustrated machine when the machine is operating in the standard rotating tine (SRT) drive mode.

It will be appreciated that the radial spacing between the hub 32 and tine pivot bolts 42 and the location of the stop surfaces 44, 45 on the inner ends of the tines should be designed so as to permit sufficient pivotal movement of the tine that the tine is positioned with an acceptable clearance or rake angle for efficient tilling in the desired mode of operation. In other words, when the tines are pivoted to a position for tilling in the standard rotating tine (SRT) drive mode, such as shown in FIG. 4, the leading cutting edge 40 of the tine should cut downwardly through the untilled soil as the machine moves in the direction of the arrow, sweeping a greater diameter than the following portions of the tine so that the following tine portions do not engage untilled soil, which would create unnecessary friction and impede efficient tilling. As shown in FIG. 4, with the tine positioned in its standard rotating tine (SRT) drive position, rotating in a clockwise direction as viewed in FIG. 4, the leading cutting edge 40 terminates at an outermost point 40a, while the outermost point 41a of the trailing cutting edge 41 moves in a arc inside the arc swept by the point 40a. Hence, with the tine 15 disposed in the SRT operating position, the tine has a rake or clearance angle β which permits efficient tilling in that drive mode.

Figure 5:
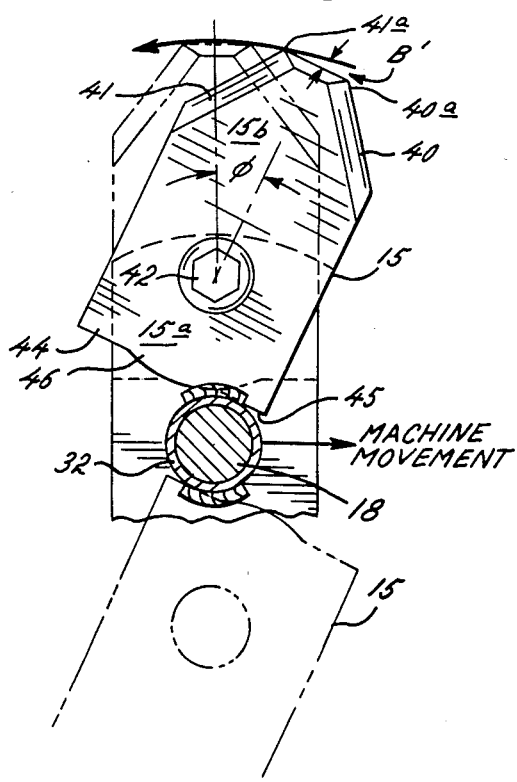
FIG. 5 is a side view, similar to FIG. 4, but showing the position of the tines when the machine is operating in a counter-rotating tine (CRT) drive mode.

With the tiller driven in a counter-rotating tine (CRT) drive mode, the tines are pivoted to the position shown in FIG. 5 and the cutting edge 41 then acts as the leading cutting edge during tilling, cutting upwardly through the untilled soil as the machine moves in the direction of the arrow. In such position, it can be seen that the outermost point 41a of the cutting edge 41 sweeps in an arc of greater diameter than the outermost point 40a of the trailing cutting edge 40. Hence, the tine again assumes a position with a rake angle β' sufficient to effect efficient tilling in the counter-rotating tine (CRT) drive mode. In practice, sufficient clearance angles β and β' are achieved when the tines are designed to pivot an angle φ (FIG. 6) on both sides of the radial center line of the respective tine mounting plates 34, 35, 36; the angle Φ being between about 22° and 28°, whereby the included angle between the standard rotating tine position and the counter-rotating tine position is between about 44° and 56°, and preferrably about 50°.

In operation of the tilling machine 10, it will be appreciated that when the machine is being transported by driving of the ground wheels, without operating the tine shaft, the tines 15 may assume any pivoted position on their pivot mounting bolts 42, between the limits established by the stop surfaces 44, 45 and the tine assembly hub 32. For purposes of illustration, FIG. 3 shows the tines in an idle or non-operating position with the tines disposed generally in radial alignment with the respective tine support plates 34, 35, 36. If it is desired to operate the tiller in a standard rotating tine (SRT) drive mode, the tine shaft may be selectively driven in the same rotary direction as the ground wheels, namely a clockwise direction as viewed in FIGS. 1 and 4, with the cutting edges 40 of the tines leading in a downward cutting direction through the untilled soil. In such case, the forces acting on the tines upon engaging the earth will automatically move the tines to the standard rotating tine (SRT) position illustrated in FIG. 4, with the tine stop surface 44 of each tine engaging the hub 32 such that the tine automatically assumes a predetermined orientation with respect to the tine shaft and is retained in such position during tilling in such drive mode, the tines each having a clearance or rake angle β that facilitates efficient tilling. In the event it is desired to operate the tilling machine in a counterrotating tine (CRT) drive mode, it is merely necessary to selectively drive the tine drive shaft 18 in the opposite rotary direction. In such event, the cutting edges 41 of the tines will lead, sweeping upwardly through the untilled soil and causing the tines to automatically assume the pivoted position, as shown in FIG. 5, with the tines having a rake or clearance angle β' for efficient tilling in such counter-rotating tine drive mode.

From the foregoing, it will be seen that the tilling machine of the present invention is adapted for thorough and efficient tilling in either standard rotating or counter-rotating drive modes, without the necessity for manual adjustment or alternation of the tines. In either case, the tines automatically assume and are retained in proper position to engage the ground at the appropriate clearance angle for efficient tilling.

We claim as our invention:

1. A soil tilling machine having a tine drive shaft, and drive means for rotating the tine shaft in both a clockwise direction and a counterclockwise direction, the improvement comprising tine support means mounted on and rotatable with the tine shaft, a plurality of tines pivotally mounted on the tine support means, said tine support means comprising a mounting plate for each tine extending radially outwardly from said tine shaft, said tines each comprising a mounting end and a ground engaging end, means pivotably supporting the mounting end of each tine on one side of its respective mounting plate with one side of the mounting end in adjacent relation to the mounting plate and the other side thereof substantially exposed, said ground engaging end of each tine having first and second cutting edges on opposite sides thereof, said first cutting edge of each tine being operable for engaging the ground when the shaft is rotated in the clockwise direction, said second cutting edge of each tine being operable to engage the ground when the shaft is rotated in the counterclockwise direction, pivot limiting means associated with each tine for positioning the tine in a first predetermined pivotal position relative to the support means and tine shaft when the tine shaft is rotated in the clockwise direction and for positioning the tine in a second predetermined pivotal position relative to the support means and tine shaft when the tine shaft is rotated in the counterclockwise direction, said pivot limiting means including stop surfaces formed on an innermost peripheral portion of the mounting end of each tine which respectively come into abutting relation with said tine shaft when each tine is in said first and second pivotal positions, and said tine each being formed with an arcuate portion disposed between said stop surfaces.

2. A soil tilling machine having a tine drive shaft, and drive means for rotating the tine shaft in both a clockwise direction and a counterclockwise direction, the improvement comprising tine support means mounted on and rotatable with the tine shaft, a plurality of tines pivotally mounted on the tine support means, said tine support means comprising a mounting plate for each tine extending radially outwardly from said tine shaft, said tines each comprising a mounting end and a ground engaging end, means pivotably supporting the mounting end of each tine on one side of its respective mounting plate with one side of the mounting end in adjacent relation to the mounting plate and the other side thereof substantially exposed, said ground engaging end of each tine having first and second cutting edges on opposite sides thereof, said first cutting edge of each tine being operable for engaging the ground when the shaft is rotated in the clockwise direction, said second cutting edge of each tine being operable to engage the ground when the shaft is rotated in the counterclockwise direction, pivot limiting means associated with each tine for positioning the tine in a first predetermined pivotal position relative to the support means and tine shaft when the tine shaft is rotated in the clockwise direction and for positioning the tine in a second predetermined pivotal position relative to the support means and tine shaft when the tine shaft is rotated in the counterclockwise direction, a retaining tab for each respective tine attached to the tine shaft and fixedly spaced from the respective tine mounting plate whereby a channel is formed between said tab and the respective mounting plate for receiving an innermost portion of the mounting end of the tine supported on the mounting plate, and said tab terminating radially inwardly of the tine support means and having a short width in relation to the mounting plate so that said other side of the mounting end of the tine remains substantially exposed.

3. The soil tilling machine as claimed in claim 2 wherein the first cutting edge of each tine sweeps a larger radius than the second cutting edge when the tine shaft is rotated in the clockwise direction, and the second cutting edge of each tine sweeps a larger radius than the first cutting edge when the tine shaft is rotated in a counterclockwise direction.

4. The soil tilling machine of claim 2 in which said tines each are mounted on the respective mounting plate for pivotable movement about a pivot axis disposed in radially spaced relation to the axis of said tine shaft.

5. The soil tilling machine of claim 4 in which said tine support means includes a plurality of radial mounting plates disposed in outwardly extending fixed relation to said tine shaft.

6. The soil tilling machine of claim 4 in which the mounting plates for pairs of said tines extend in diametrically opposed relation from said tine shaft, and said tines each are pivotably mounted on an end of one of said mounting plates.

7. The soil tilling machine of claim 6 in which the mounting plates for a plurality of said tines are mounted on a common hub, and said hub is fixed to said tine shaft.

8. The soil tilling machine of claim 2 in which said limiting means includes stop surfaces formed on an innermost peripheral portion of the mounting end of each tine which respectively come into abutting relation with said tine shaft when each tine is in said first and second positions.

9. The soil tilling machine of claim 2 in which the mounting end of each said tine is disposed in transverse relation to said tine shaft and the ground engaging end of each tine has a tip portion extending laterally from said mounting end at the distal end thereof.

10. The soil tilling machine of claim 9 in which said tip portion is tapered, and said first and second cutting edges are disposed on opposite sides of said tapered tip portion.

11. The soil tilling machine of claim 2 in which said tab extends to a point outwardly of the innermost position of the tine received in said channel but below the pivot axis for the tine.

12. The soil tilling machine of claim 2 wherein each tine is pivotable through a pivot angle of between about 45° and 50° upon positioning from said first predetermined position to said second predetermined position.

13. The soil tilling machine of claim 12 wherein the angle between said first and second predetermined tine positions is about 50°.

14. A tine assembly for use with a soil tilling machine having a rotatable tine shaft upon which the tine assembly is mounted and drive means for selectively rotating said tine shaft in both a clockwise direction and a counterclockwise direction, said tine assembly comprising tine support means, a plurality of tines pivotably mounted on said support means, said tine support means comprising a mounting plate for each tine extending radially outwardly from said tine shaft, said tines each having a mounting end and a ground engaging end, means pivotably supporting the mounting end of each tine on its respective mounting plate with one side thereof in adjacent relation to the mounting plate and the other side thereof substantially exposed, said ground engaging end of each tine having first and second cutting edges on either side thereof, said first cutting edge of each tine being operable for engaging the ground when the shaft is rotated in the clockwise direction, said second cutting edge of each tine being operable to engage the ground when the shaft is rotated in the counterclockwise direction, pivot limiting means associated with each tine for positioning the tines in a first predetermined pivotal position relative to the support means and tine shaft when the tine shaft is rotated in the clockwise direction and for positioning the tine in a second predetermined pivotal position relative to the support means and tine shaft when the tine shaft is rotated in the counterclockwise direction, a retaining tab attached to the shaft and fixedly spaced from each said mounting plate whereby a channel is formed between said tab and the respective mounting plate for receiving an innermost portion of the mounting end of the tine supported on the mounting plate, and said tab terminating radially inwardly of the tine support means and having a short width in relation to the mounting plate so that said other side of the mounting end of the tine remains substantially exposed.

15. The tine assembly of claim 14 wherein the first cutting edge of each tine sweeps a larger radius than the second cutting edge when the tine shaft is rotated in the clockwise direction, and the second cutting edge of each tine sweeps a larger radius than the first cutting edge when the tine shaft is rotated in a counterclockwise direction.

16. The tine assembly of claim 14 in which said tines each are mounted on the respective mounting plate for pivotable movement about a pivot axis disposed in radially spaced relation to the axis of said tine shaft.

17. The tine assembly of claim 16 in which said tine support means includes a plurality of radial mounting plates disposed in outwardly extending fixed relation to said tine shaft.

18. The tine assembly of claim 14 in which the mounting plates for a plurality of tines are mounted on a common hub, and said hub is fixed to said tine shaft.

19. The tine assembly of claim 14 in which said limiting means includes stop surfaces formed on an innermost peripheral portion of the mounting end of each tine which respectively come into abutting relation with said tine shaft when each tine is in said first and second positions.

20. The tine assembly of claim 14 in which the mounting end of each said tine is disposed in transverse relation to said tine shaft and the ground engaging end of each tine has a tip portion extending laterally from said mounting end at the distal end thereof, said tip portion being tapered, and said first and second cutting edges being disposed on opposite sides of said tapered tip portion.

21. The soil tilling machine of claim 14 wherein each tine is pivotable through a pivot angle of between about 45° and 50° upon positioning from said first predetermined position to said second predetermined position.

22. A soil tilling machine having a tine drive shaft, and drive means for rotating the tine shaft in both a clockwise direction and a counterclockwise direction, the improvement comprising tine support means mounted on and rotatable with the tine shaft, a plurality of tines pivotally mounted on the tine support means, said tines each comprising a ground engaging end having first and second cutting edges on either side thereof, said first cutting edge of each tine being operable for engaging the ground when the shaft is rotated in the clockwise direction, said second cutting edge of each tine being operable to engage the ground when the shaft is rotated in the counterclockwise direction, pivot limiting means associated with each tine for positioning the tine in a first predetermined pivotal position relative to the support means and tine shaft when the tine shaft is rotated in the clockwise direction and for positioning the tine in a second predetermined pivotal position relative to the support means and tine shaft when the tine shaft is rotated in the counterclockwise direction, and said pivot limiting means including stop surfaces formed on each tine which respectively come into abutting contact with said tine shaft to establish the respective first and second predetermined pivotal positions.

23. The soil tilling machine of claim 22 wherein said tine support means comprises a mounting plate for each tine extending radially outwardly from said tine shaft, said tines each having a mounting end and a ground engaging end, and means pivotably supporting the mounting end of each tine on a respective mounting plate.

24. The soil tilling machine of claim 23 in which said tines each are mounted on the respective mounting plate for pivotable movement about a pivot axis disposed in radially spaced relation to the axis of said tine shaft.

25. The soil tilling machine of claim 23 in which the mounting plates for a plurality of said tines are mounted on a common hub, and said hub is fixed to said tine shaft.

* * * * *